United States Patent
Hirayama

(10) Patent No.: US 10,113,649 B2
(45) Date of Patent: Oct. 30, 2018

(54) MAGNETIC SEAL DEVICE AND FISHING REEL INCLUDING THE SEAL DEVICE

(71) Applicant: Shimano Inc., Sakai, Osaka (JP)

(72) Inventor: Hirokazu Hirayama, Osaka (JP)

(73) Assignee: SHIMANO INC., Sakai, Osaka (JP)

( * ) Notice: Subject to any disclaimer, the term of this patent is extended or adjusted under 35 U.S.C. 154(b) by 291 days.

(21) Appl. No.: 15/167,878

(22) Filed: May 27, 2016

(65) Prior Publication Data
US 2017/0030469 A1 Feb. 2, 2017

(30) Foreign Application Priority Data
Jul. 31, 2015 (JP) .................................. 2015-151473

(51) Int. Cl.
*A01K 89/01* (2006.01)
*F16J 15/43* (2006.01)

(52) U.S. Cl.
CPC ....... *F16J 15/43* (2013.01); *A01K 89/011221* (2015.05)

(58) Field of Classification Search
CPC .......................... A01K 89/011221; F16J 15/43
See application file for complete search history.

(56) References Cited

U.S. PATENT DOCUMENTS

| | | | | |
|---|---|---|---|---|
| 4,486,026 A * | 12/1984 | Furumura | ............. | F16C 17/107 |
| | | | | 277/348 |
| 4,630,943 A * | 12/1986 | Stahl | .................. | F16C 33/1035 |
| | | | | 277/410 |
| 4,830,384 A * | 5/1989 | Raj | ........................... | F16J 15/43 |
| | | | | 277/410 |
| 4,984,908 A * | 1/1991 | Kronenberger | ....... | F16C 33/765 |
| | | | | 277/347 |
| 9,775,333 B2 * | 10/2017 | Hirayama | ...... | A01K 89/011221 |
| 2004/0262846 A1 * | 12/2004 | Anzai | ...................... | F16J 15/43 |
| | | | | 277/410 |
| 2007/0029737 A1 * | 2/2007 | Mikhalev | ................. | F16J 15/43 |
| | | | | 277/410 |
| 2010/0171271 A1 * | 7/2010 | Kung | ...................... | F16J 15/43 |
| | | | | 277/410 |

(Continued)

FOREIGN PATENT DOCUMENTS

| | | |
|---|---|---|
| JP | 1990138519 | 5/1990 |
| JP | 2001178076 | 6/2001 |

(Continued)

*Primary Examiner* — Emmanuel M Marcelo
(74) *Attorney, Agent, or Firm* — Jeffer Mangels Butler & Mitchell LLP; Brennan C. Swain, Esq.

(57) ABSTRACT

A magnetic seal device that includes a magnetic sleeve having a cylindrical body that and fits on an outer peripheral surface of a rotatable shaft, a ring shaped magnet being arranged radially outwardly from an outer peripheral surface of the magnetic sleeve with a gap, and a magnetic circuit formed between the outer peripheral surface of the magnetic sleeve and the ring shaped magnet. A magnetic fluid is maintained at the gap. The magnetic sleeve includes a groove arranged circumferentially around the outer peripheral surface of the magnetic sleeve, and a flange extending radially outwardly from and circumferentially around the outer peripheral surface of the magnetic sleeve. The flange has a diameter that is larger than a diameter of the outer peripheral surface of the magnetic sleeve.

18 Claims, 7 Drawing Sheets

(56) References Cited

U.S. PATENT DOCUMENTS

| | | | |
|---|---|---|---|
| 2011/0198814 A1* | 8/2011 | Oshita | F16C 35/04 277/501 |
| 2012/0018958 A1* | 1/2012 | Kung | F04D 29/102 277/410 |
| 2015/0216155 A1* | 8/2015 | Matsuda | A01K 89/0108 242/321 |
| 2015/0373961 A1* | 12/2015 | Horie | A01K 89/01 242/234 |

FOREIGN PATENT DOCUMENTS

| | | |
|---|---|---|
| JP | 2010110256 | 5/2010 |
| JP | 2012023965 | 2/2012 |

* cited by examiner

MAGNETIC SEAL DEVICE AND FISHING REEL INCLUDING THE SEAL DEVICE

FIELD OF THE INVENTION

The said invention relates to a magnetic seal device, and a fishing reel that includes the magnetic seal device.

BACKGROUND OF THE INVENTION

In order to prevent water from intruding into the driving part inside the accommodating space of a fishing reel body and becoming soaked in water and to achieve constantly stable driving performance even in a harsh environment where water may intrude easily, a seal device is provided for the driving part. The use of magnetic seal devices is known. For example, see Japanese Patent Application Gazette No. Heisei 11-276042, ("document 1") Japanese Patent Application Gazette No. 2012-23695 ("document 2") and Japanese Utility Model Application Gazette No. Showa 64-55324 ("document 3"), all of which are incorporated by reference herein in their entireties, and which disclose the use of magnetic seals as the seal device.

Document 1 describes a fishing reel that contains a magnetic seal device in order to prevent water from intruding the driving part inside the accommodating space of the fishing reel body to achieve constantly stable driving performance even in a harsh environment where water may intrude easily. Additionally, document 2 describes a technique that prevents the grease used for the shaft bearing from being blended with the magnetic fluid of the magnetic seal device. The fishing reel described in document 2 contains a magnetic driving part which is rotationally driven with the rotation operation of a handle, a one-way clutch which is arranged in the driving part, and a magnetic seal device which is arranged to seal the one-way clutch. The magnetic seal device contains a magnet which is arranged a certain distance from the driving part, a pair of pole plates which clamp and hold the magnet and a magnetic fluid which is retained in a magnetic circuit constituted by the magnet, the pole plates and the driving part. A groove is formed between the magnetic fluid and the one-way clutch in the driving part.

And further, document 3 describes an integral type bearing device which contains the magnetic seal device. The integral type bearing device contains a bearing body having a rotatatory shaft as an inner race, a magnetic seal device sealing a gap around the shaft on at least one side of the bearing body, and a groove being formed on the outer peripheral surface of the shaft between the magnetic seal device and the bearing body. The groove is formed as circulate or spiral.

SUMMARY OF THE PREFERRED EMBODIMENTS

In both document 2 and document 3, the rotatory shaft is made of a magnetic material and is in direct contact with the magnetic fluid. Also in document 1, the rotatory shaft is made of a magnetic material except that the magnetic seal device is integrated in the shaft bearing. Considering that the groove is arranged on the rotatory shaft, it is necessary to increase the shaft diameter for fear of deterioration of the strength of the rotatory shaft or to use a material of high strength. This does not apply to the case where the rotatory shaft is not made of a magnetic material. Likewise, in the magnetic seal device integrated in the shaft bearing according to document 1, the inner race of the shaft bearing faces the same problem as the rotatory shaft.

The present invention is made in order to address the problem stated above and to prevent the magnetic fluid from flowing out of the magnetic seal device into the sealed object without constraining the rotatory shaft.

The magnetic seal device according to the first aspect of the present invention comprises a magnetic sleeve which is fitted on the outer periphery of the rotatory shaft and has a cylindrical body on its external form, a ring-shaped magnet which is arranged on the outer peripheral surface of the cylindrical body of the magnetic sleeve with a gap and the magnetic fluid which is kept between the ring-shaped magnetic and the magnetic sleeve to form a magnetic circuit by virtue of the ring-shaped magnet and the magnetic sleeve on the outer peripheral surface of the cylindrical body. A groove that extends over the whole perimeter in the circumferential direction and a flange that extends over the whole perimeter in the circumferential direction and has an external diameter larger than that of the cylindrical body are arranged on the outer peripheral surface of the magnetic sleeve.

It is desirable that the groove and the flange are arranged in a non-first region outside the first region of the ring-shaped magnet on the outer peripheral surface of the magnetic sleeve. It is desirable that the groove is formed adjacently to the opposing region. It is desirable that the flange is formed adjacent to the groove on the opposite side and in the first region. The groove may also comprise a plurality of groove portions, each of which extends over the whole perimeter in the circumferential direction.

The magnetic seal device may also contain a ring-shaped absorbing member which faces the outer peripheral surface of the groove or the flange and can absorb the magnetic fluid. The internal diameter of the ring-shaped component may also be larger than the external diameter of the magnetic sleeve. The magnetic seal device may also contain a ring-shaped shielding component which faces the outer peripheral surface of the groove or the flange. The shielding component may be formed with a smaller internal diameter and thickness and opposite to the part which faces the outer peripheral surface of the groove or the flange and retains the magnetic fluid flowing from the groove.

A fishing reel according to the second aspect of the present invention contains a reel body, a rotatory shaft rotatably supported by the reel body, an accommodating member which is fixed relative to the reel body and accommodates a part of the rotatory shaft which extends from an opening, and a magnetic seal device according to the first aspect which seals the gap between the accommodating member and the rotatory shaft at the opening of the accommodating space wherein the magnetic sleeve is fitted onto the rotatory shaft. The magnetic seal device is arranged in such a way that the groove extends from the ring-shaped magnet to the inside of the accommodating member.

According to the present invention, a magnetic sleeve, on the outer peripheral surface of which a groove extends over the whole perimeter in the circumferential direction and a flange extends over the whole perimeter in the circumferential direction and has an external diameter larger than that of a cylindrical body, is fitted to a rotatory shaft. A magnetic circuit is formed by a ring-shaped magnet and the magnetic sleeve, and a magnetic fluid is retained between the ring-shaped magnet and the magnetic sleeve. Therefore, the present invention can prevent the magnetic fluid from flowing out of the magnetic seal device into the sealed object without constraining the rotatory shaft.

In accordance with another aspect of the invention there is provided a magnetic seal device that includes a magnetic sleeve having a cylindrical body and fitting on an outer peripheral surface of a rotatable shaft, a ring shaped magnet being arranged radially outwardly from an outer peripheral surface of the magnetic sleeve with a gap, and forming a magnetic circuit between the outer peripheral surface of the magnetic sleeve and the ring shaped magnet, and a magnetic fluid being maintained at the gap. The magnetic sleeve includes a groove arranged circumferentially around the outer peripheral surface of the magnetic sleeve, and a flange extending radially outwardly from and circumferentially around the outer peripheral surface of the magnetic sleeve. The flange has a diameter that is larger than a diameter of the outer peripheral surface of the magnetic sleeve. In a preferred embodiment, the outer peripheral surface of the magnetic sleeve includes a first region that opposes the ring shaped magnet and the groove and the flange are not positioned in the first region. Preferably, the groove is positioned adjacent to the first region. In a preferred embodiment, the flange is positioned adjacent to the groove on an opposite side of the first region.

In a preferred embodiment, the groove includes at least two groove portions that arranged circumferentially around the outer peripheral surface of the magnetic sleeve. Preferably, the device also includes a ring shaped absorbing member that is arranged to face the groove or the flange. In a preferred embodiment, the ring shaped absorbing member has an inner diameter that is larger than the outer diameter of the outer peripheral surface of the magnetic sleeve. In a preferred embodiment, the device includes a ring shaped shielding member that is arranged to face the groove or the flange. Preferably, the ring shaped shielding member includes a lip portion that has an inner diameter and a thickness that decreases toward the first region.

In accordance with another aspect of the invention there is provided a fishing reel that includes a reel body, a rotatable shaft rotatably supported by the reel body, an accommodating member being arranged on a front portion of the reel body, and accommodating at least part of the rotatable shaft that extends from an opening of the accommodating member, and the magnetic seal device described above. The magnetic seal device seals between the accommodating member and the rotatable shaft at the opening of the accommodating member.

In accordance with another aspect of the invention there is provided a magnetic seal device that includes a magnetic sleeve that is configured to be disposed around a rotatable shaft and a ring shaped magnet arranged radially outwardly from an outer peripheral surface of the magnetic sleeve. The magnetic sleeve includes a groove defined in and arranged circumferentially around the outer peripheral surface of the magnetic sleeve. A gap is defined between the ring shaped magnet and the outer peripheral surface of the magnetic sleeve. A magnetic circuit is formed between the outer peripheral surface of the magnetic sleeve and the ring shaped magnet, and a magnetic fluid is maintained in the gap.

In a preferred embodiment, the magnetic sleeve includes a flange extending radially outwardly from and arranged circumferentially therearound. The flange has a diameter that is larger than a diameter of the outer peripheral surface of the magnetic sleeve. Preferably, the outer peripheral surface of the magnetic sleeve includes a first region that opposes the ring shaped magnet, and wherein the groove and the flange are not positioned in the first region. In a preferred embodiment, the groove is positioned adjacent to the first region. Preferably, the flange is positioned adjacent to the groove on an opposite side of the first region.

In a preferred embodiment, the groove comprises at least two groove portions that arranged circumferentially around the outer peripheral surface of the magnetic sleeve. Preferably, a ring shaped absorbing member is positioned such that it faces the groove or the flange. Preferably, the ring shaped absorbing member has an inner diameter that is larger than the outer diameter of the outer peripheral surface of the magnetic sleeve. In a preferred embodiment, the device includes a ring shaped shielding member that is positioned such that it faces the groove or the flange. Preferably, the ring shaped shielding member includes a lip portion that has an inner diameter and a thickness that decreases toward a tip thereof.

The invention, together with additional features and advantages thereof, may be best understood by reference to the following description.

BRIEF DESCRIPTION OF THE DRAWINGS

Like numerals refer to like parts throughout the several views of the drawings.

DETAILED DESCRIPTION OF THE PREFERRED EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

It will be appreciated that terms such as "front," "back," "top," "bottom," "side," "short," "long," "up," "down," "left," "right" and "below" used herein are merely for ease of description and refer to the orientation of the components as shown in the figures. It should be understood that any orientation of the components described herein is within the scope of the present invention.

Figure 1:
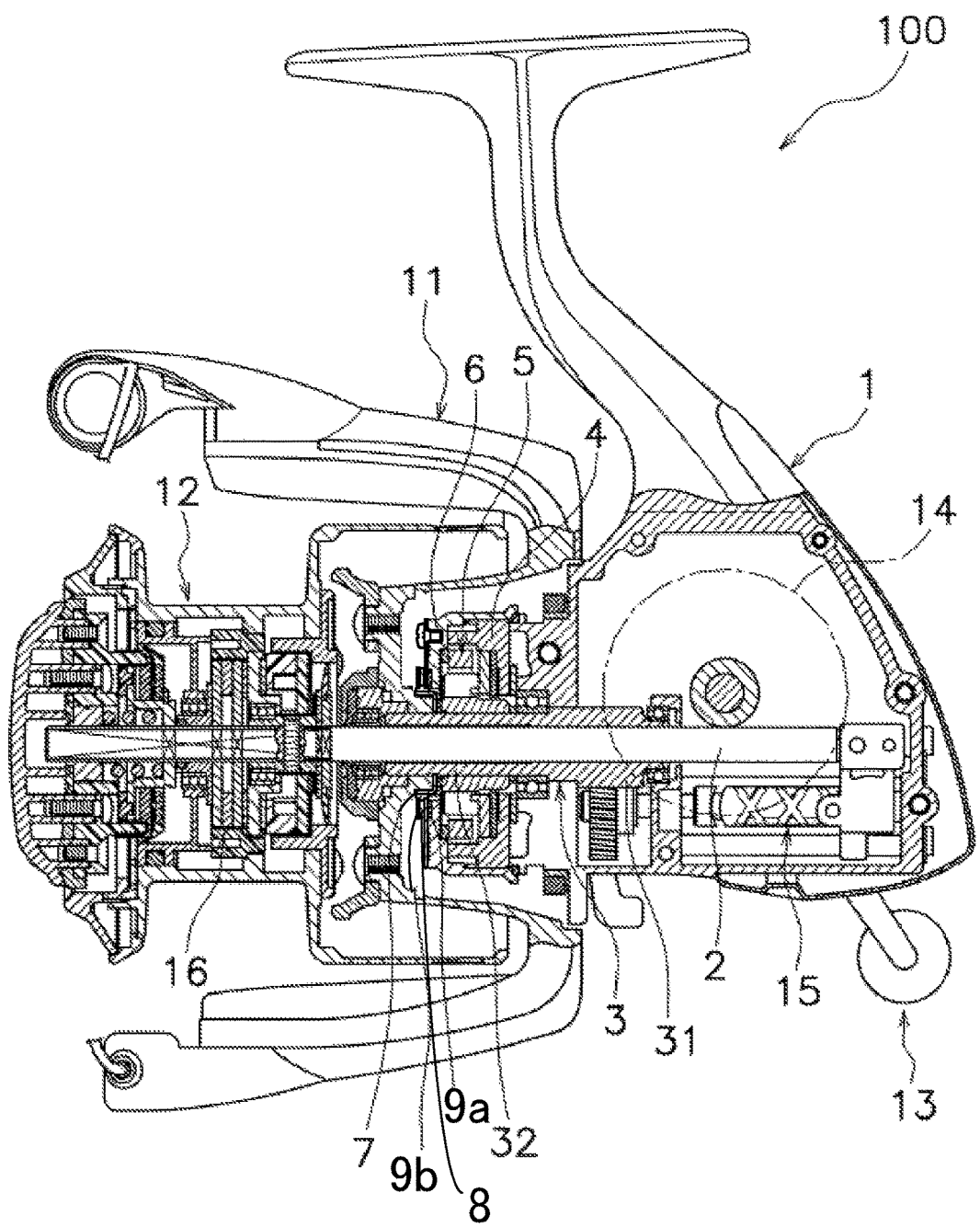
FIG. 1 is a sectional view of the fishing reel in accordance with a first embodiment of the present invention.

FIG. 1 is a sectional view of the fishing reel according to embodiment 1 of the present invention. In the embodiment, the fishing reel is a spinning reel 100. The spinning reel 100 is installed on the fishing rod with its left-hand side facing the tip (front) of the fishing rod when facing FIG. 1. The spinning reel 100 contains a reel body 1, a rotor 11, a spool 12 and a handle 13. A fishing line (not shown in the drawing) winded on the spool 12 is let out in the forward direction, i.e., towards the left-hand side of FIG. 1.

The rotor 11 rotates around the center shaft which extends in the longitudinal direction, i.e. the left-right direction of FIG. 1 by rotating the handle 13, which is a crank. When the handle 13 is rotated, the spool 12 reciprocates in the longitudinal direction simultaneously with the rotation of the rotor 11. Actuated by the reciprocating movement, the let-out fishing line is guided by the rotor 11 and uniformly wound onto the cylinder surface of the spool 12.

The rotor 11 is fitted to an attaching portion 32 of a pinion gear 3, fixed to the pinion gear 3 and rotated together with the pinion gear 3. The pinion gear 3 is rotatably supported by the reel body 1. The pinion gear 3 is a hollow cylinder and a spool shaft 2 goes through the pinion gear 3. The spool shaft 2 and the pinion gear 3 rotate and reciprocate oppositely. The spool 12 is installed on the front end of the spool shaft 2 via a drag mechanism 16. The rear end of the spool shaft 2 is connected to an oscillating device 15.

The handle 13 is a crank and a driving gear 14 is installed on the crank shaft. The driving gear 14, for example, a bevel gear, engages a gear portion 31 of the pinion gear 3. The oscillating device 15 rotates simultaneously with the pinion gear 3. When the oscillating device 15 rotates, the spool shaft 2 is reciprocated in the longitudinal direction. The rear end side of the spool shaft 2, the gear portion 31 side of the pinion gear 3, the driving gear 14 and the oscillating device 15 are accommodated in the reel body 1.

A one-way clutch 5 is arranged between the pinion gear 3 and an accommodating member 4 so that the pinion gear 3 rotates in one direction only. The accommodating member 4 is fixed on the reel body 1. The inner race of the one-way clutch 5 is fitted to the pinion gear 3 and rotated together with the pinion gear 3. The outer race of the one-way clutch 5 is fitted to and fixed on the accommodating member 4.

The one-way clutch 5 is, for example, a roller type one-way clutch. The roller type one-way clutch is constituted by the outer race, the inner race, a roller and a spring, wherein the cam surface is arranged on the inner periphery of the outer race or the outer periphery of the inner race. The roller is arranged opposite to the cam surface and kept by the spring to contact the cam surface of the outer race and an outer periphery of the inner race, or the cam surface of the inner race and an inner periphery of the outer race. When the inner race attempts to rotate relative to the outer race in a direction that will make the cam surface become narrower, the contact pressure between the cam surface and the roller will increase to become a resistance and the inner ring will not rotate relative to the outer ring. When the inner race attempts to rotate in an adverse direction, the contact pressure between the cam surface and the roller will become low, the roller will rotate freely and the inner race will rotate relative to the outer race. As a result, the pinion gear 3 rotates in one direction only.

The one-way clutch 5 is retained in the accommodating member 4 by a cover member 6. The cover member 6 covers the front side of the accommodating member 4 except the rotation portion constituted by the pinion gear 3 and a boss portion of the rotor 11 which is fitted to the pinion gear 3. The cover member 6 is fixed without contacting the rotation portion.

In order to seal a gap between the cover member and the boss portion of the rotor 11, a magnetic seal device that contains a ring-shaped magnet 8 and magnetic plates 9a and 9b is provided. Additionally, a magnetic sleeve 7, which is formed in a ring shape to encompass the outer periphery of the pinion gear 3 in the rotation direction, is fitted to the pinion gear 3. The magnetic sleeve 7 is formed by a magnetic material. The outer periphery of the magnetic sleeve 7 opposes the inner peripheries of the magnet 8 and the magnetic plates 9a and 9b, and there is a gap between the magnetic sleeve 7 and the magnet 8 and the magnetic plates 9a and 9b. An external portion of the magnetic sleeve 7 which opposes the magnet 8 and the magnetic plates 9a and 9b is a cylinder. A magnetic circuit is formed by the magnet 8, the magnetic plates 9a and 9b and the magnetic sleeve 7. The magnetic fluid is retained between the magnetic sleeve 7 and the magnetic plates 9a and 9b and the gap between the cover member 6 and the magnetic sleeve 7 (the boss portion) is sealed.

The boss portion of the rotor 11 and the magnetic sleeve 7 are fitted to the pinion gear 3 in such a way that they do not rotate relatively. The boss portion and the magnetic sleeve 7 from an opening of the cover member, the pinion 3, which is the rotatory shaft, and the accommodating member 4 compose an accommodating space which accommodates at least one part of the pinion gear 3. The cover member 6 and the accommodating member 4 are fixed relative to the reel body. The magnetic seal device seals the gap between the opening of the cover member 6 and the rotatory shaft at the opening of the accommodating space.

Figure 2:
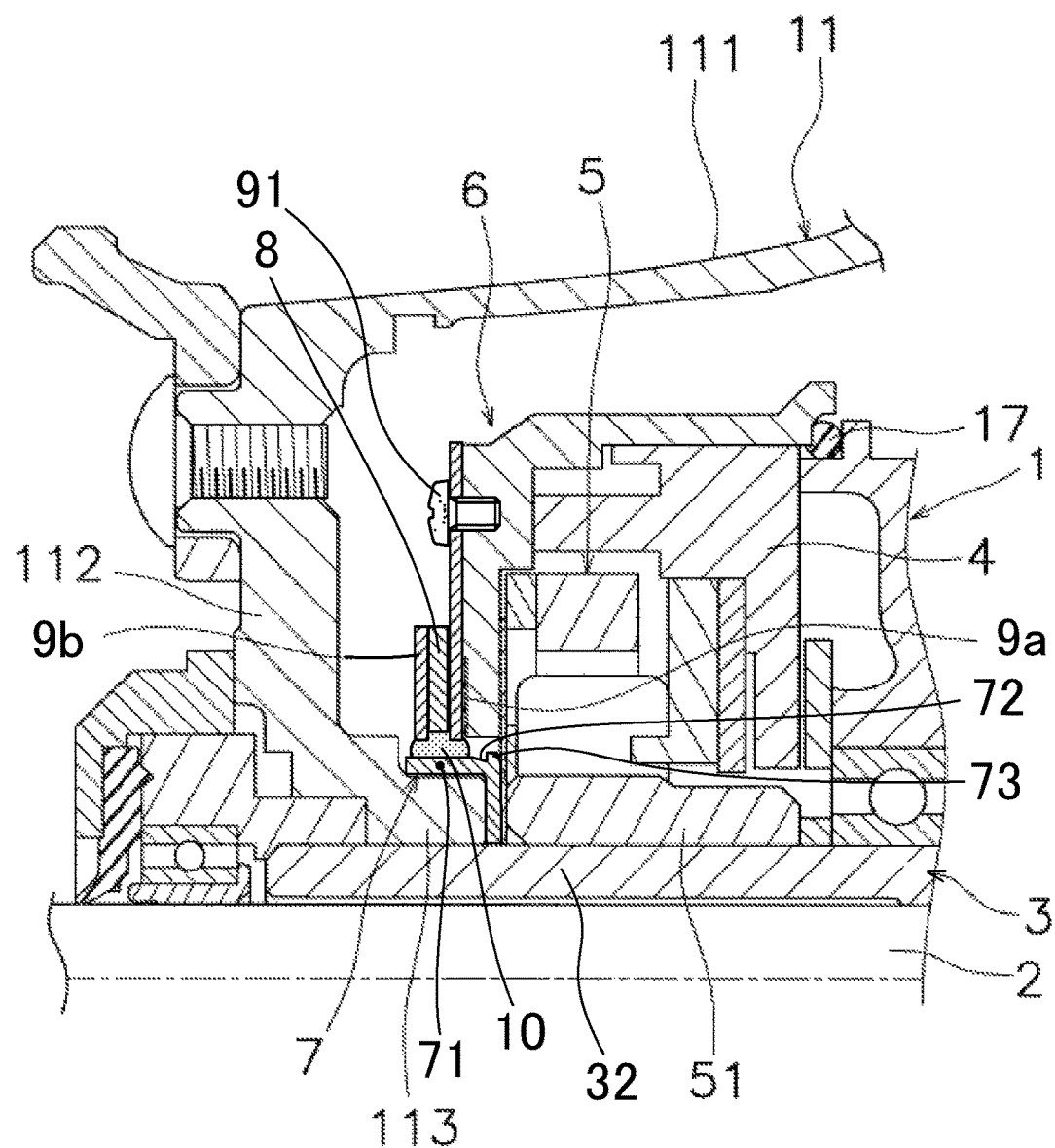
FIG. 2 is a sectional view of the magnetic seal device part of FIG. 1.

FIG. 2 is a sectional view of the magnetic seal device according to embodiment 1. FIG. 2 only shows one side relative to the central line of spool shaft 2.

The rotor 11 comprises a cylindrical body 111, a wall portion 112 and a boss portion 113, which are integrated by one member. The cylindrical body 111 is a cylindrical member and has an accommodating space inside. The wall portion 112 is a round plate and has an opening at its center. The outer periphery of the wall portion 112 is connected with the inner periphery of the cylindrical body 111. The boss portion 113 extends from the inner periphery end side of the wall portion 112 to the one-way clutch 5 side. The boss portion 113 is fitted and fixed to the attaching portion 32 of the pinion gear 3 and the rotor 11 rotates with the pinion gear 3.

The accommodating member 4 is fixed by, for example, a screw so that it does not rotate in front of the reel body 1 relative to the reel body 1. The one-way clutch 5 is accommodated in the accommodating member 4. The cover member 6 is of a ring shape comprising a cylindrical body which covers the outer periphery of the accommodating member 4 and a cover part which covers the front part of the accommodating member 4. The cover member 6 retains the one-way clutch 5 at the accommodating space of the accommodating member 4 with the cover part. The cover member 6 is fixed to the reel body by, for example, a screw. An O-ring 17 is arranged between the end of the cylindrical body of the cover member 6 and the reel body 1. The inner peripheral surface of the cover member 6 opposes the outer peripheral surface of the magnetic sleeve 7 with a gap between them.

The magnetic sleeve 7 is formed in a ring shape which circles the outer periphery of the boss portion 113 in its rotation direction and is fitted to the boss portion 113. In the example shown in FIG. 2, the magnetic sleeve 7 contains a round plate which is in contact with the outer periphery of the pinion gear 3. The inner periphery of the magnetic sleeve 7 is fitted to the pinion gear 3. The outer peripheral surface of the magnetic sleeve 7 is defined by the mating of the magnetic sleeve 7 and the pinion gear 3.

The magnet 8 is arranged in the cylindrical body 71 of the magnetic sleeve 7 with a gap and faces the outer peripheral surface. The magnet plates 9a and 9b are in the cylindrical body 71 of the magnetic sleeve 7 arranged with a gap and face the outer peripheral surface. Both the magnetic plates 9a and 9b are of a ring shape which surrounds the outer periphery of the magnetic sleeve 7 in its rotation radius direction. The magnetic plates 9a and 9b clamp the magnet 8 in the rotatory shaft direction. The external diameter of the magnetic plate 9a which is arranged on the cover member 6 (the accommodating member) side of the magnet 8 is larger than that of the magnetic plate 9b which is arranged on the opposite side of the cover member 6 of the magnet 8.

The magnet 8, the magnetic plate 9a and the magnetic plate 9b are fixed to each other by, for example, an adhesive agent to form a magnet constituent. The magnetic plate 9a is joined with the cover member 6 by a fixing member such as a screw 91 and the magnet constituent is fixed to the cover member 6. The screw 91 comprises a screw part which is bolted into the screw hole formed in the cover member 6 and a screw head which presses down the magnetic plate 9a. More than two screws 91 are arranged on the periphery centered on the center shaft of the pinion gear 3 at even intervals. The edge of the cover member 6 on the rotor 11 side is a level surface.

There is a gap between the magnet 8 and the inner periphery of the magnetic plates 9a and 9b and the magnetic sleeve 7. A magnetic fluid 10 is retained in the gap. The magnetic sleeve 7, the magnet 8, the magnetic plates 9a and 9b and the magnetic fluid 10 comprise the magnetic seal device.

The magnetic circuit is formed by the magnet 8, the magnetic plate 9a, the magnetic sleeve 7 and the magnetic plate 9b. The magnetic fluid is a substance formed by stably dispersing ferromagnetic fine particles with a particle size ranging from a few nm to tens of nm into a, for example, hydrocarbon oil or fluorine oil based solvent by using a surfactant. Because the portion of the magnetic sleeve 7 which faces the magnet 8 and the magnetic plates 9a and 9b is magnetized, the magnetic fluid 10 is retained in the space surrounded by the magnet 8, the magnetic plates 9a and 9b and the magnetic sleeve 7. The gap between the magnet 8, the magnetic plates 9a and 9b and the magnetic sleeve 7 is sealed by the magnetic fluid 10 to prevent foreign objects from infiltrating from the accommodating space of the cylindrical body 111 to the one-way clutch 5 side. The magnetic seal device boasts high gas sealing performance because the periphery of the magnetic sleeve 7 is surrounded by liquid. Additionally, no dust is produced because there is no solid contact at the seal portion. Furthermore, torque loss is reduced and there is hardly any deterioration in the rotational performance because there is no solid sliding at the seal portion.

In FIG. 2, the magnetic fluid 10 fills the whole space surrounded by the magnet 8, the magnetic plates 9a and 9b and the magnetic sleeve 7. The magnetic fluid 10 may also be retained between the magnetic plate 9a and the magnetic sleeve 7 or between the magnetic plate 9b and the magnetic sleeve 7. Additionally, the magnetic fluid 10 may also be divided into two portions, which are separately retained between the magnetic plate 9a and the magnetic sleeve 7 and between the magnetic 9b and the magnetic sleeve 7.

Because the magnetic force line of the magnet 8 is attracted to and passes through the magnetic plates 9a, 9b and the magnetic sleeve 7, the magnetic flux of the magnet 8 does not leak on the one-way clutch 5 side. Therefore, the inner race 51 of the one-way clutch is not magnetized and the operation of the one-way clutch 5 does not influence the magnet 8. As a result, the present embodiment not only is easy to assembly but can also ensure uncompromised function of the one-way clutch 5 and stable waterproof performance.

It will be understood that, if, for example, an external force such as an impact is imposed on the spinning reel 100, it is possible that part of the magnetic fluid 10 will move from the space surrounded by the magnet 8, the magnetic plates 9a, 9b and the magnetic sleeve 7. If the magnetic fluid 10 flows into, for example, the one-way clutch 5, it is possible that part of the one-way clutch 5 will be magnetized and the roller will be attracted to a portion of the cam surface which has either high or low contact pressure. In such a case, it is possible that the roller cannot restrain rotation of the one-way clutch 5 when it should be stopped and that the resistance is increased when it should rotate. Additionally, because the lubricant of the one-way clutch 5 or the shaft bearing contains different ingredients than the magnetic fluid 10, if the magnetic fluid 10 is mingled into the lubricant, the properties of the lubricant such as lubrication and coating protection will be impaired.

Therefore, it is necessary to prevent the magnetic fluid 10 from flowing into the sealed objects of the magnetic seal device such as the one-way clutch 5 and the shaft bearing. In embodiment 1, the magnetic sleeve 7 includes a groove 72, which extends over the whole perimeter in the circumferential direction, and a flange 73, which extends over the whole perimeter in the circumferential direction and has an external diameter larger than that of the cylindrical body 71 of the magnetic sleeve 7, are arranged on the outer peripheral surface of the magnetic sleeve 7.

Figure 3:
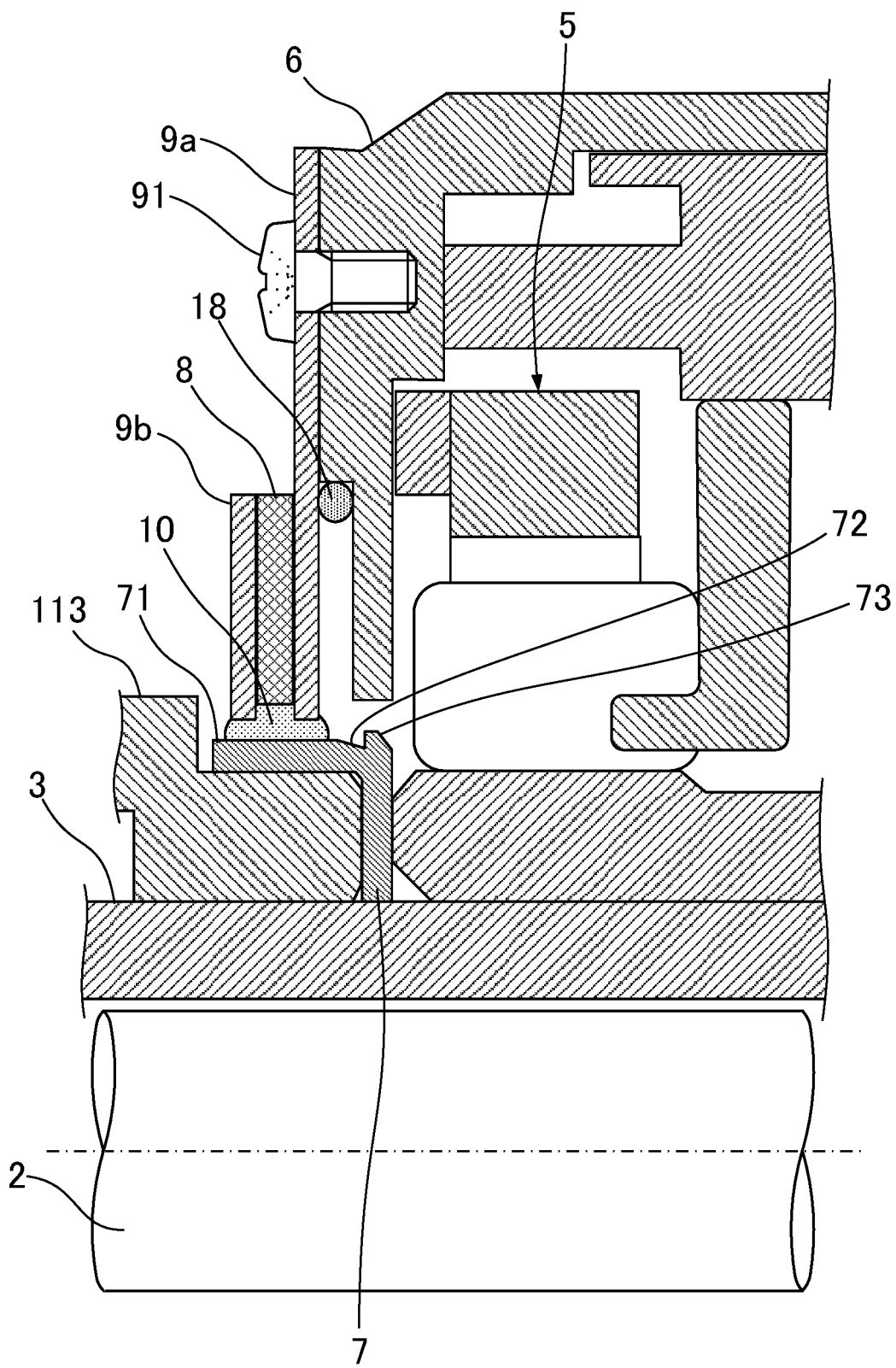
FIG. 3 is an expanded sectional view of the magnetic seal device part of FIG. 1.

FIG. 3 is an expanded sectional view of the magnetic seal device according to embodiment 1. FIG. 3 only shows one side relative to the spool shaft 2. Additionally, an O-ring 18 is arranged between the magnetic plate 9a and the cover member 6 in FIG. 3.

The magnetic sleeve 7 comprises the cylindrical body 71, the groove 72 and the flange 73. The portion of the magnetic sleeve 7 which faces the magnet 8 and the magnetic plates 9a and 9b is the cylindrical body 71. The groove 72 extends over the whole perimeter in the circumferential direction on the outer peripheral surface of the magnetic sleeve. The flange 73 extends over the whole perimeter in the circumferential direction of the magnetic sleeve and preferably has an external diameter larger than that of the cylindrical body 71. In another embodiment, the flange can have an external diameter that is the same or smaller than the external diameter of the remainder of the cylindrical body 71.

The groove 72 and the flange 73 are formed on the outer peripheral surface of the magnetic sleeve 7 in a region that does not oppose or is outside of the region that opposes the magnet 8 and the magnetic plates 9a and 9b (the area of the cylindrical portion 71 of the magnetic body 71 that opposes the magnet 8 and magnetic plates 9a and 9b is referred to herein as the first region). The groove 72 is formed adjacent to the first region. That is to say, the cylindrical body 71 is connected to the groove 72 without increasing the external diameter of the cylindrical body 71. A part with an external diameter larger than the cylindrical body 71 may also be formed between the groove 72 and the cylindrical body 71.

The flange 73 is formed adjacent to the groove 72 on the opposite side of the first region. That is to say, the flange starts from the place on the opposite side of the groove 72 which has the same external diameter as the cylindrical body 71. A portion with an external diameter the same as that of the cylindrical body 71 may also be formed between the groove 72 and the flange 73.

The groove 72 may have various shapes as long as its volume is enough to hold the moving magnetic fluid 10. Preferably, the cross-sectional shape of the groove 72 forms an inclination on the flange side that is close to being or is perpendicular with the shaft so that the magnetic fluid 10 is hard to move to the flange 73. Additionally, it is desirable that the inclination of the surface opposite the flange (nearer the first region) is gentler than the surface close to the flange 73 side so that the magnetic fluid 10 may be able to flow back to the first region.

In the magnetic seal device according to embodiment 1, because the groove 72 and the flange 73 are formed in the magnetic sleeve 7, even if part of the magnetic fluid 10 moves from the cylindrical body 71 to the cover member 6 side, it will gather in the groove 72 instead of going beyond the flange 73 and flowing into the one-way clutch 5. The magnetic fluid 10 gathering in the groove 72 will return to the first regions of the magnetic plates 9a and 9b when an external force is imposed on the cylindrical body 71 side. Therefore, the material and the strength of the pinion gear 3 is not restricted by the magnetic seal device.

Figure 4:
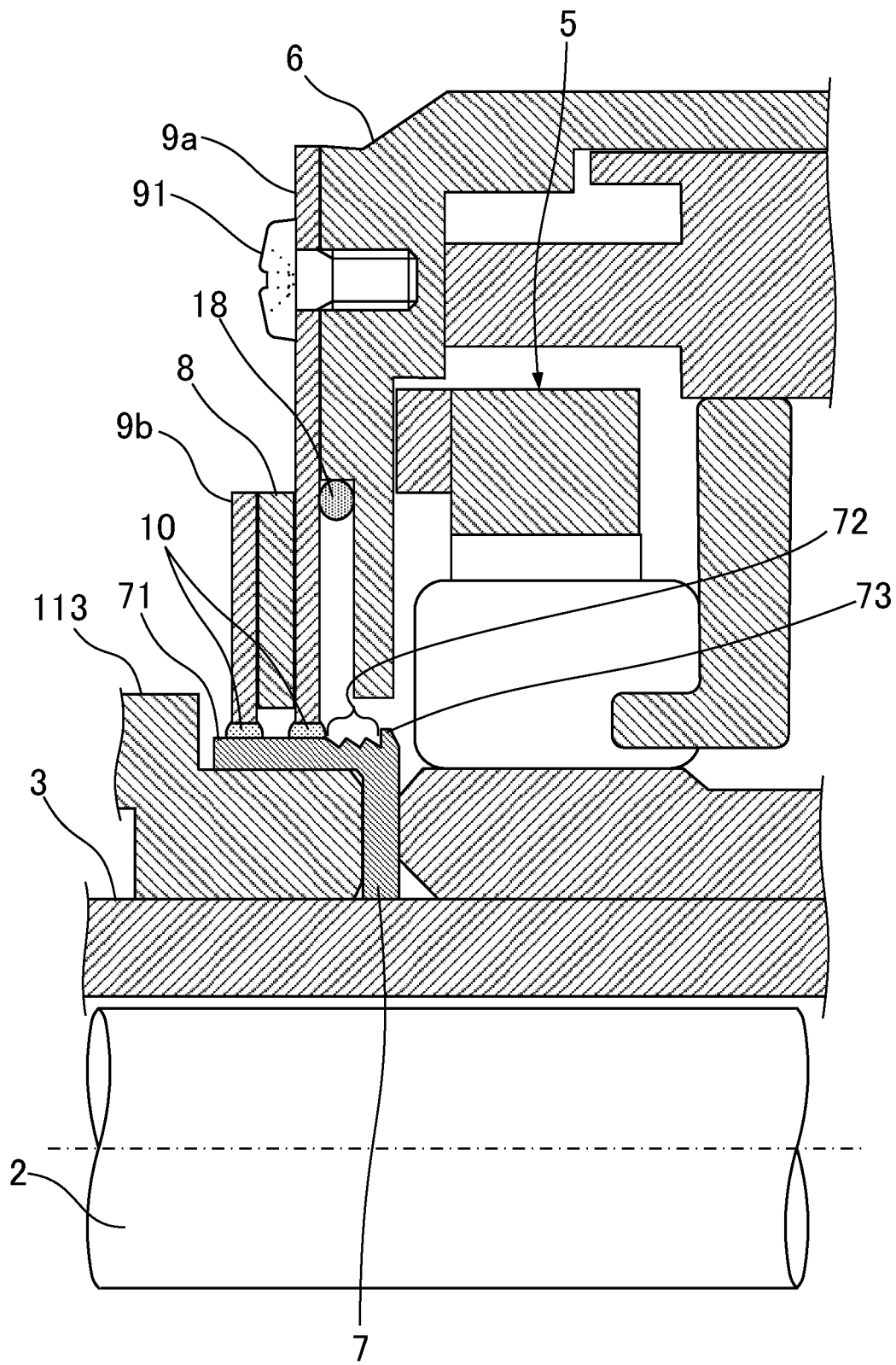
FIG. 4 is an expanded sectional view of the magnetic seal device part in accordance with a second embodiment of the present invention.

FIG. 4 is an expanded sectional view of the magnetic seal device according to embodiment 2 of the present invention. FIG. 4 only shows one side relative to the spool shaft 2. In embodiment 2, a groove 72 of the magnetic sleeve 7 comprises a plurality of groove portions. Other constitution is same as embodiment 1. FIG. 4 shows an example where the magnetic fluid 10 is divided into two parts and retained separately between the magnetic plate 9a and the magnetic sleeve 7 and between the magnetic plate 9b and the magnetic sleeve 7.

In the example of FIG. 4, the groove comprises 3 groove portions, which may have different or the same width and depth. Additionally, they may have a portion or portions with an external diameter larger than that of the cylindrical body 71 between or around the groove portions. The groove portions may all be in a ring shape or some or all of them may be in a spiral shape. For example, the groove portion on the cylindrical body 71 side and the groove portion on the flange 73 side can be of a ring shape while the groove portion in between is of a spiral shape. In the case that all the groove portions are of a spiral shape, it is desirable that the external diameter of the flange 73 is larger than that of the cylindrical body 71.

In case that some or all of the groove portions are of a spiral shape, it is desirable that the magnetic fluid 10 that may gather in the groove 72 spirals in the direction moving to the first region side of the magnet 8 and the magnetic plates 9a and 9b when the rotor 11 rotates. For example, in case that the rotor 11 rotates clockwise when the spinning reel 100 viewed in front of it winds the fishing line, the spiral is preferably right-hand threaded. In case that the rotor 11 rotates counter-clockwise, the spiral is preferably left-hand threaded.

In the magnetic seal device according to embodiment 2, because the groove 72 comprises a plurality of groove portions, the magnetic fluid 10 is hard to move further to the flange 73 and can be surely prevented from exceeding the flange 73 and flowing into the one-way clutch 5.

Figure 5:
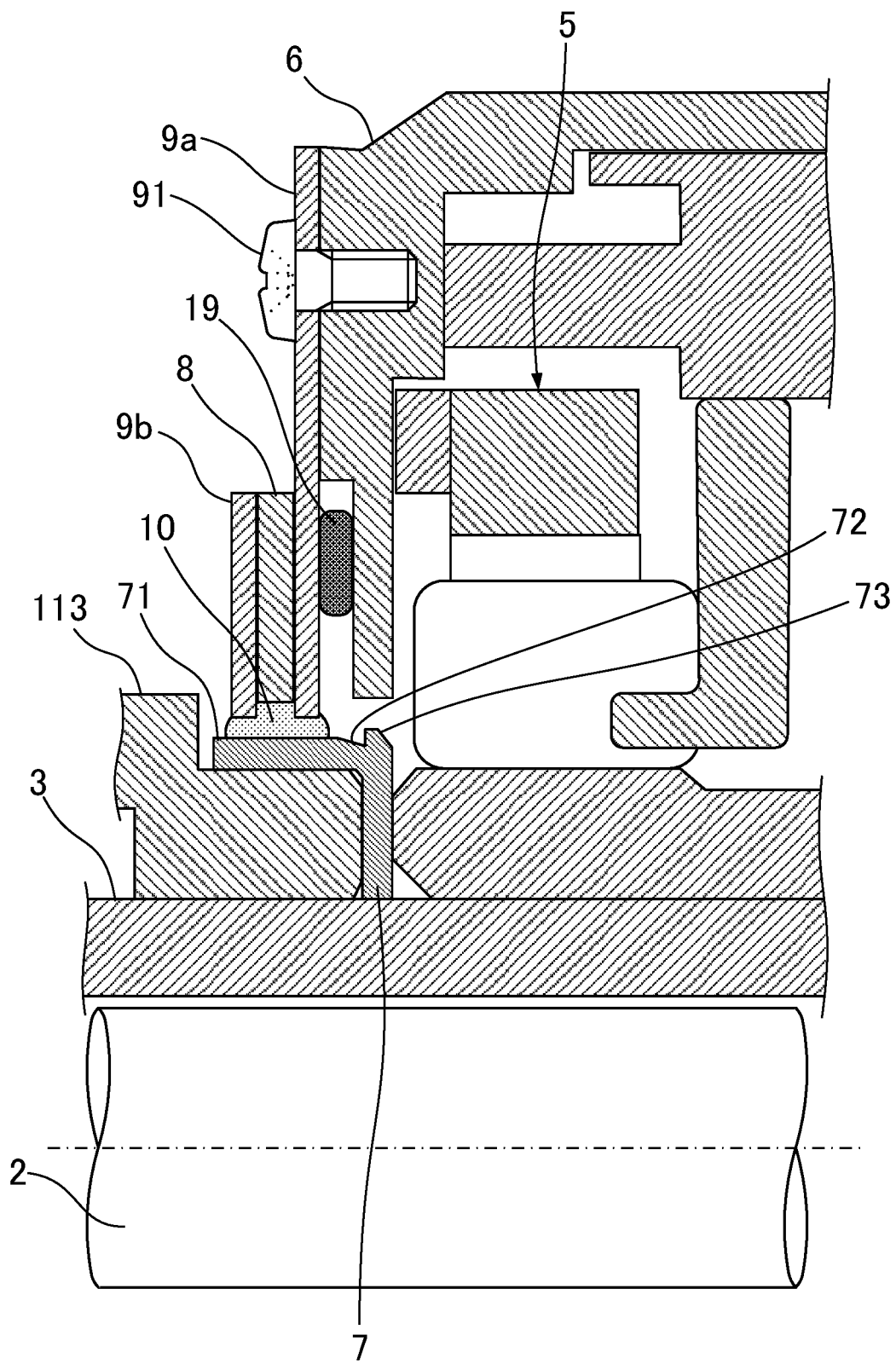
FIG. 5 is an expanded sectional view of the magnetic seal device part in accordance with a third embodiment of the present invention.

FIG. 5 is an expanded sectional view of the magnetic seal device according to embodiment 3 of the present invention. FIG. 5 only shows one side relative to the spool shaft 2. Embodiment 3 contains a ring shaped absorbing member 19 which opposes the outer peripheral surface of the groove 72 and/or the flange 73 and can absorb the magnetic fluid 10 in addition to the constitution of embodiment 1. The ring shaped absorbing member 19 is of a ring shape which circles the outer periphery of the groove 72 or the flange 73 of the magnetic sleeve 7. The ring shaped absorbing member 19 is made of non-woven fabric such as felt, which absorbs the magnetic fluid easily. The material of the ring shaped absorbing member 19 may be any material that can absorb the magnetic fluid 10 without being limited to felt.

It is desirable that the internal diameter of the ring shaped absorbing member 19 is larger than that of the magnetic sleeve 7. All of the magnetic fluid 10 is retained in the first region of the magnetic sleeve 7, the magnet 8 and the magnetic plates 9a and 9b while the internal diameter of the ring shaped absorbing member is given such a size that the member shaped absorbing member 19 does not contact the magnetic fluid 10. In FIG. 5, even if the ring shaped absorbing member inclines to the radius direction, it is of such a size not to contact the magnetic fluid 10. If the magnetic sleeve 7 has a portion with an external diameter larger than that of the cylindrical body 71, it is acceptable that the internal diameter of the ring shaped absorbing member 19 is smaller than that of the magnetic sleeve 7. For example, if the external diameter of the flange 73 is larger than that of the cylindrical body 71 and the ring shaped absorbing member 19 does not confront the external periphery of the flange 73, the internal diameter of the member shaped absorbing member 19 may be smaller than the external diameter of the flange 73.

The ring shaped absorbing member 19 can be substituted for the O-ring 18 or provided together with the O-ring 18. FIG. 5 shows a constitution that does not contain the O-ring 18. In case that the O-ring 18 is provided, the O-ring 18 will be arranged outside the pinion gear 3 in its rotation radius direction and the member shaped absorbing member 19 will be arranged inside the O-ring 18.

In the magnetic seal device according to embodiment 3, because the magnetic fluid 10 which moves in the rotation radius direction of the pinion gear 3 is absorbed by the member shaped absorbing member 19, the magnetic fluid 10 can be surely prevented from flowing into the one-way clutch 5.

Figure 6:
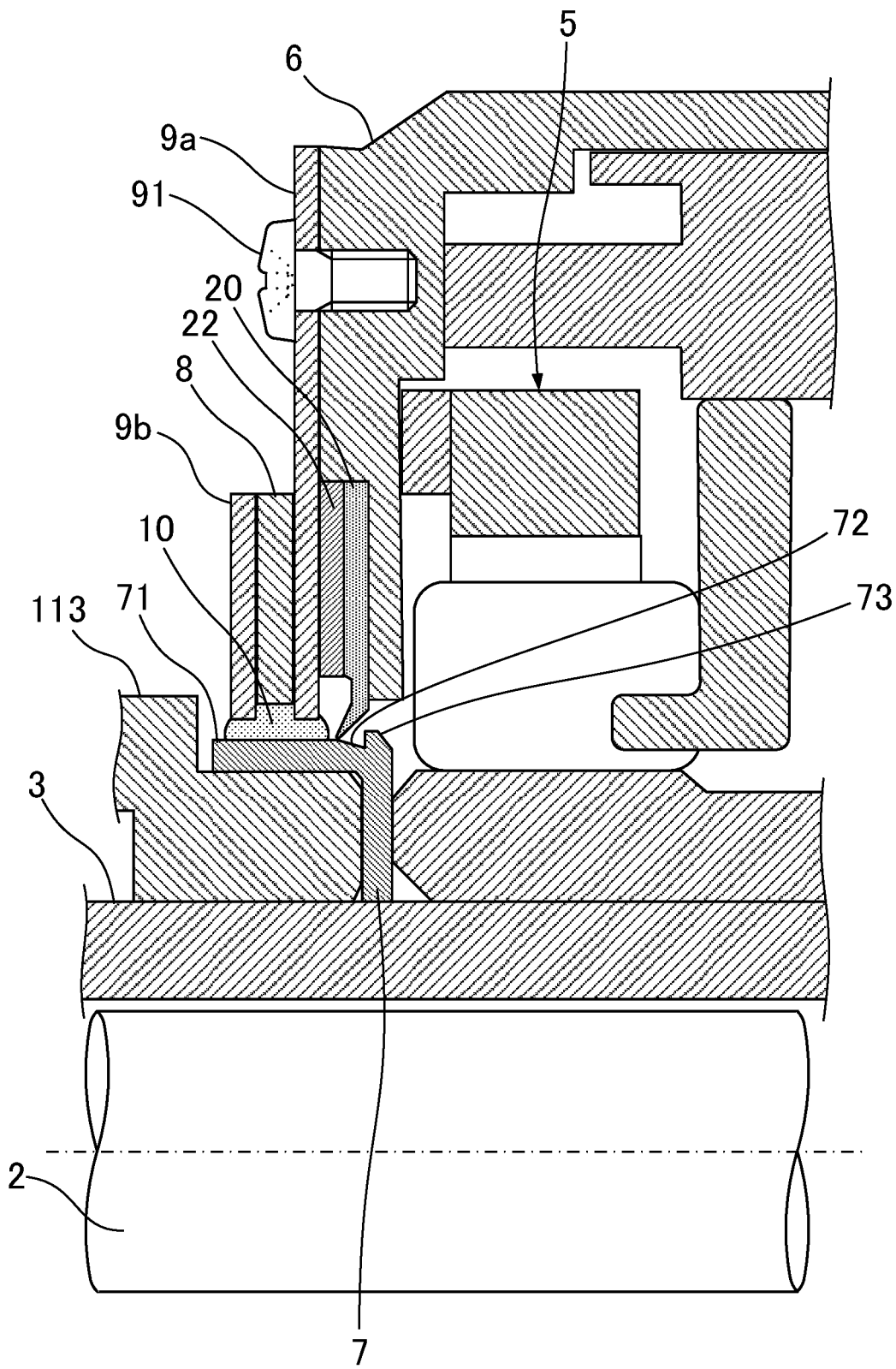
FIG. 6 is an expanded sectional view of the magnetic seal device part in accordance with a fourth embodiment of the present invention.

FIG. 6 is an expanded sectional view of the magnetic seal device part according to embodiment 4 of the present invention. FIG. 6 only shows one side relative to the spool shaft. Embodiment 4 contains a ring shaped shielding member 20 which opposes the outer peripheral surface of the groove 72. The shielding member 20 is of ring shape which circles the outer periphery of the groove 72 of the magnetic sleeve 7. The shielding member 20 has an internal diameter and a thickness which is gradually reduced from the groove 72 of the magnetic sleeve 7 towards the first region of the magnet 8 and the magnetic plates 9a and 9b. In the example of FIG. 6, the shielding member 20 clamps a spacer 22 and is retained between the magnetic plate 9a and the cover member 6.

The inner diameter of the shielding member 20 approaches but does not contact the external diameter of the magnetic sleeve 7 or slightly contacts it. The shielding member 20 is a synthetic resin elastomer such as NBR, SBR or silicon rubber. In case that the shielding member 20 does not contact the magnetic sleeve 7, it is also acceptable that the shielding member 20 is not an elastomer. However, in case that the shielding member 20 contacts the elastic collar 7, even slightly, at least the lip portion on the inner periphery side should be an elastomer which is easy to transform. In case that the shielding member 20 is an elastomer, it may wrap a rigid reinforcing ring (not shown in the drawing).

In case that the inner periphery of the shielding member 20 is in contact with the whole outer periphery of the magnetic sleeve 7, the magnetic fluid will be sheltered by the shielding member 20 and very little will be leaked to the flange 73 side. Even in case that the inner periphery of the shielding member 20 does not contact the outer periphery of the magnetic sleeve 7, because the magnetic fluid 10 is retained due to the capillary action between the shielding member 20 and the magnetic sleeve 7, it very little will be leaked to the flange 73 side. As a result, the magnetic fluid 10 can be surely prevented from flowing into the one-way clutch 5.

Figure 7:
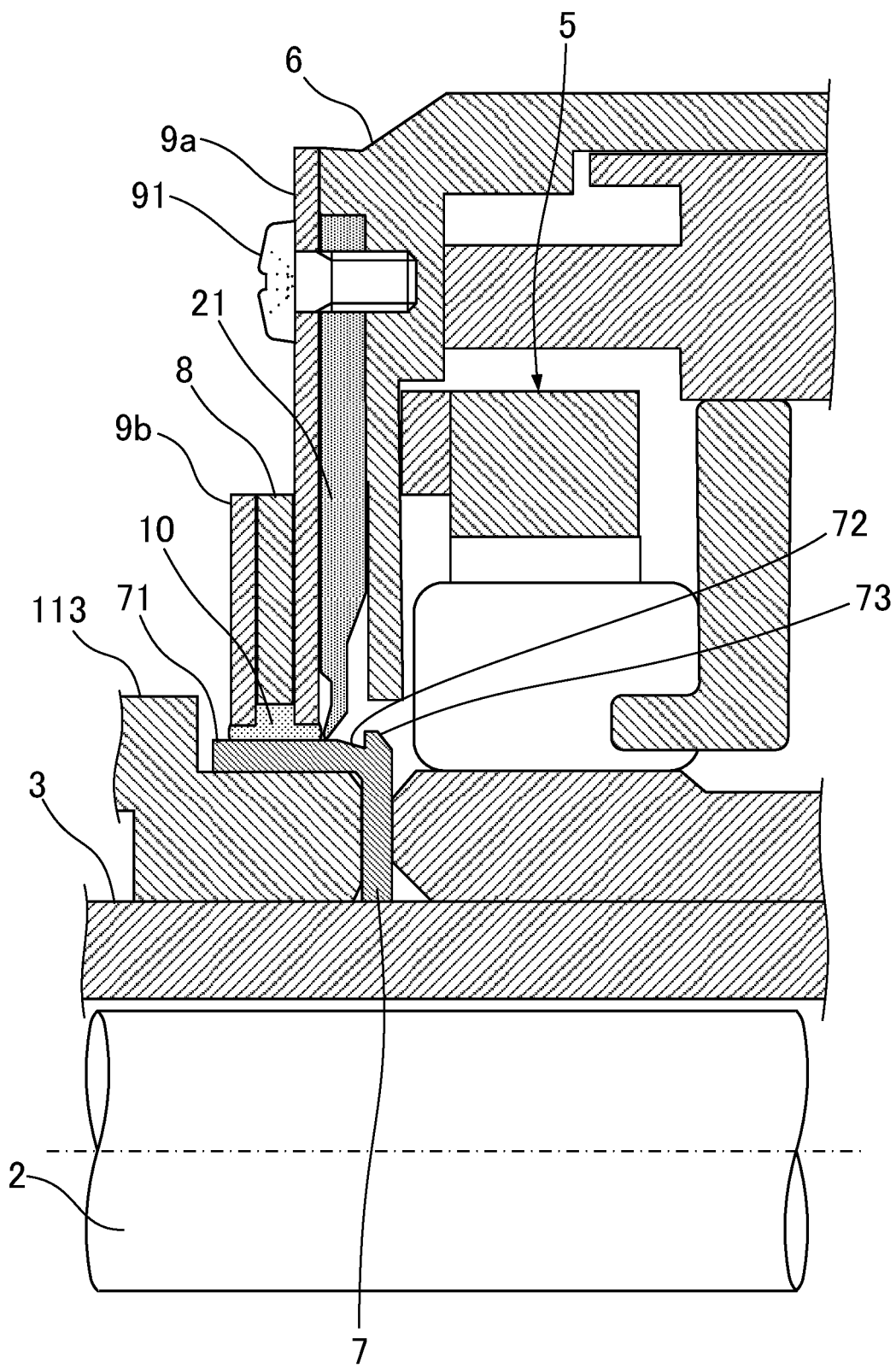
FIG. 7 is an expanded sectional view of the magnetic seal device part in accordance with a fifth embodiment of the present invention.

FIG. 7 is an expanded sectional view of the magnetic seal device according to an alternative of embodiment 4. In the alternative, the external diameter of the shielding member 21 is larger than the hole of the screw 91 which fixes the magnetic plate 9*a* to the cover member 6. The shielding member 21 and the magnetic plates 9*a* are screwed to the cover member 6 together. In the structure, the magnet constituent comprising the magnet 8, the magnetic plate 9*a* and the magnetic plate 9*b* and the shielding member 21 can be installed to the cover member 6 in combination in advance. Additionally, in embodiment 4, the shielding member 21 has the function of the O-ring 18 at the same time.

In embodiment 4, the inner peripheral portion of the shielding member 20 or 21 has an internal diameter and a thickness which is gradually reduced from the groove 72 of the magnetic sleeve 7 toward the first region of the magnet 8 and the magnetic plates 9*a* and 9*b*. The section of the inner periphery portion of the shielding member 20 or 21 may have a thin front end. For example, it is acceptable that the angle on the magnetic sleeve 7 side is close to 90° and the its thickness remains the same towards the front end although it is inclined in such way that its internal diameter decreases from the groove 72 to the first region of the magnet 8 and the magnetic plates 9*a* and 9*b*. Even in these shapes, when the shielding member 20 or 21 does not contact the outer periphery of the magnetic sleeve 7, the magnetic fluid 10 is retained due to the capillary action between the shielding member 20 or 21 and the magnetic sleeve 7.

The constitutions in embodiments 1 through 4 can be appropriately combined for use. For example, the ring shaped absorbing member 19 in embodiment 3 can be combined with the groove comprising a plurality of grooves in embodiment 2 and can be used in combination. The shielding member 20 in embodiment 4 can be combined with the groove 72 comprising a plurality of grooves in embodiment 2. The ring shaped absorbing member 19 in embodiment 3 can be used together with the shielding member 20 in embodiment 4. In such a case, the ring shaped absorbing member 19 can be arranged on the magnet 8 side or the cover member 6 side. Embodiments 2 through 4 can be combined to constitute the magnetic seal device.

Although it is described in these embodiments that the one-way clutch 5 fitted to the pinion gear 3 which drives the rotor 11 of the spinning reel 100 is sealed by the magnetic seal device, the magnetic seal device of the fishing reel is not limited thereto. The embodiments stated above can be applied to a magnetic seal device which seals the opening of the accommodating member which protrudes the rotatory shaft from the opening and accommodates part of the rotatory shaft.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including," "having" and their derivatives. The term "mounted" or "mounting," as used herein, encompasses configurations in which an element directly secured to another element by affixing the element is directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "attached", "bonded", "fixed" and their derivatives. Also, the terms "part," "section," "portion," "member" or "element" when used in the singular can have the dual meaning of a single part or a plurality of parts. Finally, terms of degree such as "substantially," "about" and "approximately" as used herein mean a reasonable amount of deviation of the modified term such that the end result is not significantly changed.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. § 112, ¶6, other aspects may likewise be embodied as a means-plus-function claim, or in other forms, such as being embodied in a computer-readable medium. (Any claims intended to be treated under 35 U.S.C. § 112, ¶6 will begin with the words "means for"). Accordingly, the applicant reserves the right to add additional claims after filing the application to pursue such additional claim forms for other aspects of the disclosure.

Accordingly, although exemplary embodiments of the invention have been shown and described, it is to be understood that all the terms used herein are descriptive rather than limiting, and that many changes, modifications, and substitutions may be made by one having ordinary skill in the art without departing from the spirit and scope of the invention.

What is claimed is:

1. A magnetic seal device comprising:
   a magnetic sleeve having a cylindrical body and fitting on an outer peripheral surface of a rotatable shaft,
   a ring shaped magnet being arranged radially outwardly from an outer peripheral surface of the magnetic sleeve with a gap, and forming a magnetic circuit between the outer peripheral surface of the magnetic sleeve and the ring shaped magnet, and
   a magnetic fluid being maintained at the gap,
   wherein the magnetic sleeve includes
      a groove arranged circumferentially around the outer peripheral surface of the magnetic sleeve, and
      a flange extending radially outwardly from and circumferentially around the outer peripheral surface of the magnetic sleeve, wherein the flange has a diameter that is larger than a diameter of the outer peripheral surface of the magnetic sleeve, and
   a ring shaped absorbing member that is arranged to face the groove or the flange, wherein the absorbing member is configured to absorb the magnetic fluid.

2. The magnetic seal device according to the claim 1 wherein the outer peripheral surface of the magnetic sleeve includes a first region that opposes the ring shaped magnet, and wherein the groove and the flange are not positioned in the first region.

3. The magnetic seal device according to the claim 2 wherein the groove is positioned adjacent to the first region.

4. The magnetic seal device according to the claim 3 wherein the flange is positioned adjacent to the groove on an opposite side of the first region.

5. The magnetic seal device according to the claim 1 wherein the ring shaped absorbing member has an inner diameter that is larger than the outer diameter of the outer peripheral surface of the magnetic sleeve.

6. A fishing reel comprising:
a reel body;
a rotatable shaft rotatably supported by the reel body;
an accommodating member being arranged on a front portion of the reel body, and accommodating at least part of the rotatable shaft, wherein at least a part of the rotatable shaft extends from an opening of the accommodating member;
the magnetic seal device of claim 1,
wherein the magnetic seal device seals between the accommodating member and the rotatable shaft at the opening of the accommodating member.

7. The magnetic seal device of claim 1 wherein the outer peripheral surface of the magnetic sleeve includes a first region that opposes the ring shaped magnet, and wherein the groove and the flange are not positioned in the first region.

8. The magnetic seal device of claim 7 wherein the groove is positioned adjacent to the first region.

9. The magnetic seal device of claim 8 wherein the flange is positioned adjacent to the groove on an opposite side of the first region.

10. The magnetic seal device of claim 9 wherein the groove comprises at least two groove portions that are arranged circumferentially around the outer peripheral surface of the magnetic sleeve.

11. The magnetic seal device of claim 1 further comprising a ring shaped shielding member that is positioned such that it faces the groove or the flange.

12. The magnetic seal device according to the claim 11 wherein the ring shaped shielding member includes a lip portion that has an inner diameter and a thickness that decreases toward a tip thereof.

13. A magnetic seal device comprising:
a magnetic sleeve having a cylindrical body and fitting on an outer peripheral surface of a rotatable shaft,
a ring shaped magnet being arranged radially outwardly from an outer peripheral surface of the magnetic sleeve with a gap, and forming a magnetic circuit between the outer peripheral surface of the magnetic sleeve and the ring shaped magnet, and
a magnetic fluid being maintained at the gap,
wherein the magnetic sleeve includes
first and second adjacent grooves that are arranged circumferentially around the outer peripheral surface of the magnetic sleeve, and
a flange extending radially outwardly from and circumferentially around the outer peripheral surface of the magnetic sleeve, wherein the flange has a diameter that is larger than a diameter of the outer peripheral surface of the magnetic sleeve.

14. A magnetic seal device comprising:
a magnetic sleeve having a cylindrical body and fitting on an outer peripheral surface of a rotatable shaft,
a ring shaped magnet being arranged radially outwardly from an outer peripheral surface of the magnetic sleeve with a gap, and forming a magnetic circuit between the outer peripheral surface of the magnetic sleeve and the ring shaped magnet, and
a magnetic fluid being maintained at the gap,
wherein the magnetic sleeve includes
a groove arranged circumferentially around the outer peripheral surface of the magnetic sleeve, and
a flange extending radially outwardly from and circumferentially around the outer peripheral surface of the magnetic sleeve, wherein the flange has a diameter that is larger than a diameter of the outer peripheral surface of the magnetic sleeve, and
a ring shaped shielding member that includes an inner surface that contacts the cylindrical body between the magnetic fluid and the groove.

15. The magnetic seal device according to the claim 14 wherein the ring shaped shielding member includes a lip portion that has an inner diameter and a thickness that decreases toward the first region.

16. A magnetic seal device comprising:
a magnetic sleeve that is configured to be disposed around a rotatable shaft, wherein the magnetic sleeve includes a groove defined in and arranged circumferentially around an outer peripheral surface of the magnetic sleeve,
a ring shaped magnet arranged radially outwardly from an outer peripheral surface of the magnetic sleeve, wherein a gap is defined between the ring shaped magnet and the outer peripheral surface of the magnetic sleeve, wherein a magnetic circuit is formed between the outer peripheral surface of the magnetic sleeve and the ring shaped magnet, and wherein a magnetic fluid is maintained in the gap, and
a ring shaped absorbing member that is arranged to face the groove, wherein the absorbing member is configured to absorb the magnetic fluid.

17. The magnetic seal device of claim 16 wherein the magnetic sleeve includes a flange extending radially outwardly from and arranged circumferentially therearound, and wherein the flange has a diameter that is larger than a diameter of the outer peripheral surface of the magnetic sleeve.

18. The magnetic seal device of claim 16 wherein the ring shaped absorbing member has an inner diameter that is larger than the outer diameter of the outer peripheral surface of the magnetic sleeve.

* * * * *